United States Patent

Saltini

[15] 3,641,508

[45] Feb. 8, 1972

[54] TRANSMISSION TERMINAL

[72] Inventor: Fabrizio Saltini, Modena, Italy

[73] Assignee: Ing. C. Olivetti & C., S.p.A., Ivrea (Turin), Italy

[22] Filed: Dec. 31, 1969

[21] Appl. No.: 889,758

[30] Foreign Application Priority Data

Feb. 12, 1969 Italy ....................50559-A/69

[52] U.S. Cl. ....................340/172.5
[51] Int. Cl. ....................G06f 3/00
[58] Field of Search ....................340/172.5

[56] References Cited

UNITED STATES PATENTS

| | | | |
|---|---|---|---|
| 3,273,131 | 9/1966 | Strohm et al. | 340/172.5 |
| 3,289,171 | 11/1966 | Scherr et al. | 340/172.5 |
| 3,469,244 | 9/1969 | Perotto et al. | 340/172.5 |
| 3,337,854 | 8/1967 | Cray et al. | 340/172.5 |
| 3,351,917 | 11/1967 | Shimabukuro | 340/172.5 |
| 3,411,142 | 11/1968 | Lee et al. | 340/172.5 |
| 3,414,887 | 12/1968 | Scantlin | 340/172.5 |
| 3,491,341 | 1/1970 | Alaimo | 340/172.5 |
| 3,492,656 | 1/1970 | Hildebrandt | 340/172.5 |

*Primary Examiner*—Paul J. Henon
*Assistant Examiner*—Paul R. Woods
*Attorney*—Birch, Swindler, McKie & Beckett

[57] ABSTRACT

This invention relates to a transmission terminal unit responsive to transfer instructions from a computer for serially transferring a plurality of information segments one at a time between successive locations within a region of a serial memory of the computer and an external system. The transmission terminal comprises buffer means for temporarily storing an information segment presently being transferred, means for serially transferring the information segments between said buffer means and the successive locations in the serial memory. Furthermore the transmission terminal comprises means responsive to the instructions from the computer for controlling the direction of transfer of the information segments by said transferring means and to signals from said computer and said external system for controlling the timing of the transfer by enabling, after the receipt of a ready signal from the external system, said transferring means to operate to transfer the next successive information segment when the location within the region of the serial memory which is next to be operated upon is available for transfers.

8 Claims, 3 Drawing Figures

INVENTOR
FABRIZIO SALTINI

BY

ATTORNEYS

*INVENTOR*
FABRIZIO SALTINI

BY

ATTORNEYS

TRANSMISSION TERMINAL

CROSS-REFERENCE TO RELATED APPLICATION

Applicant claims priority from corresponding Italian Pat. application Ser. No. 50559–A/69, filed Feb. 12, 1969.

BACKGROUND OF THE INVENTION

Field of the Invention

1. This invention relates generally to terminal units for electronic computers and more particularly to transmission terminal units for connecting an electronic computer to a peripheral, another computer, a transmission line, or the like.

2. Description of the Prior Art

In many large scale computer systems the central computer receives data for processing from a plurality of peripheral stations and terminals and transmits the results back to the respective units after performing the necessary operations.

Often a large portion of the processing required is of a simple nature and could be performed much more economically locally at the peripheral station without involving the central computer. The central computer would perform the administrative functions of the system and handle those problems which are too large to be solved easily at the peripheral stations.

Each of the peripheral stations, instead of being merely a data input and output device for the central computer, would include its own small scale computer with its own peripheral units. The local small scale computer would be capable of operating separately from the central computer and would send the results of its calculations and any necessary data to the central computer.

In order to connect it, usually, through a transmission line, into a large scale computer system it is necessary to provide a small scale computer with a transmission terminal unit for transferring and buffering the information. Transmission terminal units are known for large scale computers but their complexity has prevented ones of this type from being used with small computers since the cost would be prohibitive. Furthermore obvious simplifications of these terminals still would not make them economically feasible for use with small computers.

Another problem with small computers is that the number of different peripheral units with which they can be used has been limited for economic reasons because each peripheral unit must be specially designed to connect to the particular computer. There has been no general purpose terminal available for small scale computers which could act as a standard interface with any one of a large variety of standard peripheral units or with a transmission line.

OBJECTS AND SUMMARY OF THE INVENTION

It is therefore an object of the invention to increase the efficiency and flexibility of computer systems having a plurality of peripheral and terminal units.

In carrying out this and other objects of this invention there is provided a general purpose transmission terminal unit responsive to transfer instructions from a computer for serially transferring a plurality of information segments between successive locations within a region of a serial recirculating memory of the computer and an external system, comprising buffer means for temporarily storing an information segment presently being transferred and means for serially transferring information segments between said buffer means and the successive locations in the memory. Also provided are means responsive to the transfer instructions from the computer for controlling the direction of transfer of the information segments by the transferring means and to signals from said computer and said external system for controlling the timing of the transfer by enabling the transferring means to transfer the next segment when the location within the region of the serial memory which is next to be operated upon is available for transfer after the external system has signaled that is ready to receive or has sent the next information segment.

Various other objects, advantages and features of this invention will become more fully apparent from the following specification with its appended claims and accompanying drawings in which:

DETAILED DESCRIPTION

The invention can best be understood from the following detailed description of the illustrated embodiment. The illustrated embodiment of the transmission terminal of the invention is described in relation to the computer described in U.S. Pat. application Ser. No. 783,894 filed on Dec. 16, 1968 now U.S. Pat. No. 3,585,600 and assigned to the assignee of the present invention. This computer is described for purposes of illustration only and shall not be considered as a limitation on the scope of the invention.

Figure 1:
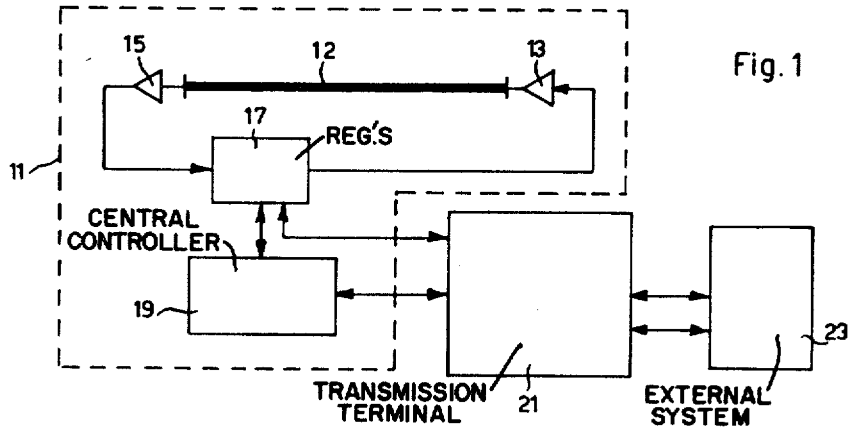
FIG. 1 is a block diagram of a computer system including a transmission terminal unit according to this invention.

A simplified block diagram of a system including the invention is illustrated in FIG. 1 of the drawings. The portion of the computer 11 directly involved with the transmission terminal of the invention includes a serial recirculating memory which in the illustrated embodiment may be a delay line 12 having a write amplifier 13 and a read amplifier 15 connected to its input and output ends respectively. The output of read amplifier 15 and the input of write amplifier 13 are connected to the input and output respectively of a group of registers 17.

Information is stored serially in the memory 12 in the form of characters made up of six binary bits. The registers 17 perform a character-by-character serial-to-parallel conversion on the bits as they are output by the amplifier 15 and make the characters successively available for processing. The registers 17 then reconvert the characters to serial form for being rerecorded on the delay line memory 12. The operation of the registers 17 and of the arithmetic and logical circuits (not shown) of the computer 11 are controlled by the central controller 19.

The transmission terminal 21 of the invention in response to instructions from the computer 11 transfers information between the registers 17 and an external systems 23 which may be another computer, a transmission line, a peripheral unit, etc. The transmission terminal 21 also sends control signals to and receives them from the central controller 19 and the external system 23.

While the transmission terminal 21 is executing an instruction for the transfer of information between the external system 23 and the delay line memory 12, the computer 11 may continue with the execution of its program executing further instructions as long as they do not interfere with the execution of the transfer. This capability is explained in more detail in the above-mentioned U.S. Pat. No. 3,585,600.

The provision of the terminal 21 makes it possible to use the computer 11 as a terminal for a larger scale computer system which terminal performs the operations for which it is suited and passes larger problems on to the larger scale computer. In this way the system efficiency and flexibility may be maximized. The terminal 21 also provides a standard means for connecting the computer 11 to various peripheral units or to a transmission line.

As explained in more detail in the above mentioned patent the computer 11 executes instructions grouped in 32 character macroinstructions. Each macroinstruction contains a label in the first character place which tells how the instructions which make up the macroinstruction are to be interpreted. In the illustrated embodiment of the invention, macroinstructions for transferring information to and receiving information from the transmission terminal 21 have a label character equal to 7 or 6, respectively. In character place 18 of such macroinstructions there is contained a code which tells whether a transfer is to be executed. Codes in place 19 and 20 indicated the type of transfer and whether the sign of the numerical data is to be transmitted, respectively.

The delay line 12 is closed on registers 17 which convert the groups of six bits of information corresponding to a character from series to parallel and from parallel to series. Each character is formed by two tag bits and four information bits, which latter bits are operated on in parallel at each period of a character generated every six bit periods.

The memory 12 contains a number of fixed zones of predetermined capacity and position. The remainder may be subdivided into zones of variable length. The zones are adjacent to one another and each of them contains $n$ cells C1–C$n$ (with $n$ variable from zone to zone as hereinafter described) each for storing a character plus a leading cell CO identifying the beginning of the zone.

Each cell is formed by six binary places B1–B6. The first place B1 is used to contain a beginning-of-zone bit B1 which has the function of zone indicator to identify the zone to the transfer means, being equal to one only in the leading cell CO. The second place B2 is used to contain a marker bit B2 which identifies an individual cell during certain operations in order to distinguish it from the adjacent cells, this bit B2 being equal, within each zone, to one in the cell to be identified. The remaining places B3–B6 contain the four information bits B3–B6 which are differently interpreted depending on the cell and the zone containing them, as specified hereinafter.

The subdivision of the delay line memory 12 into zones is effected by a succession of operations which begin, upon the switching on of the machine, with the creation of a first zone with a length of 1+32 cells defined by two beginning-of-zone bits B1 disposed in the first and 34th cells respectively, and the writing of an and-of-memory character FM located in the last cell of the memory 12.

In consequence of the initial conditions which are created upon switching on, a "memory division" macroinstruction located at a fixed address of a tape memory, (not shown), is transferred to the first zone.

The execution of this initial division macroinstruction produces the division of the delay line 12 into the following zones:

Program zone: ZEO1 with a length of 1+32 cells (the first is the leading cell CO) and intended to receive the successive macroinstructions of the program one at time. The macroinstruction transferred from time to time from the tape memory to the zone ZEO1 is then automatically carried out.

Address zone: ZEO1 with length of 1+2 cells which are used to store a two-character address.

Printing subprogram zone: ZEO3 with length of 1+32 cells, in which zone there is stored a block containing instructions and data having the function of a printing subprogram.

Arithmetical zone: ZE04 with a length of 1+64 cells, which represents a pair of 32 character arithmetical registers for carrying out computation operations. The two registers, A and B, are interlaced character by character.

Slide zone: ZE05 which may have a length of from 1+3 to 1+15 cells and which is used to receive the digital data entered from the keyboard.

Indirect address zone: ZEO6 with a length of 1+3 cells which are used to contain a three-character address.

The remaining portion of the memory 12 is left undivided by the effect of the performance of the initial division macroinstruction.

At any point during the execution of a program, it is possible to execute further division macroinstructions, whose execution produces the subdivision of the remaining portion (whether this is still undivided or already divided) into zones which may contain alphabetical and numerical data. The length of each zone and the number of zones is determined by the division macroinstruction.

Each data zone may be intended to contain numerical or alphabetical characters. A numerical or alphabetical character occupies one or two adjacent cells, respectively, of the memory 12.

The numerical information therefore engages as many memory cells as there are digits of which the information is composed, plus one leading cell. The alphabetical information, on the other hand, occupies as many pairs of memory cells as there are characters plus two leading cells. The distinction between numerical zones and alphabetical zones is therefore determined by the fact that the first have only one leading cell, while the second have two leading cells. Alphabetical zones can contain numerical as well as alphabetical characters.

In the program zone ZEO1 and in the address zones ZEO2 and ZEO6, the leading cell CO contains only the beginning-of-zone bit B1=1, while the following cells each contain, in the bits places B3–B6 a character which indicated a function or part of an address in the internal binary code.

In the arithmetic zone ZEO4, in the slide zone ZEO5 and in other numerical zones the leading cell CO may contain, in addition to the beginning-of-zone bit B1=1, a bit B6=1 for indicating the minus sign of the operand contained in the same zone, while the other cells may contain binary coded decimal digits.

In each of the numerical data zones, the leading cell CO contains the beginning-of-zone bit B1=1. The three binary positions B3–B5 may contain a zone code for indicating that the zone has been engaged for an internal or external transfer. The binary place B6 may contain a bit B6=1 for indicating the minus sign of the number contained in the zone.

In each of the alphabetical data zones, the first leading cell, in which the bits B1, B3, B4 and B5 are used as in the numerical data zone, is followed by a second leading cell with only the bit B1=1. The following pairs of cells of the alphabetical zone may contain numerical and alphabetical characters in a seven bit per character code.

The identification of the zones in addressing the memory 12 takes place by counting the beginning-of-zone bits B1. The two consecutive bits B1 present at the beginning of each alphabetical zone are counted as a single bit.

The data zones of the memory 12 may moreover be marked by an operation code which is written in the leading cell. The recording of an operation code at the beginning of a zone indicates that the zone is to be used in a particular type of operation. There are four zone operation codes:

Internal operations code, used for identifying zones to be used for transfers between internal devices of the computers;

Printing code, used for the zones intended for printing;

Keyboard code, used for the zones intended to receive characters from the keyboard;

External operations code, used to identify the zones to be used for transfers from or to the transmission terminal unit or from or to other peripheral units.

It is also possible to define a long field in the portion of the memory 12 which was left undivided by the original memory division macroinstruction which may contain a plurality of zones. This is accomplished by recording an external operation code in the leading cells both at the beginning and at the end of the part of the memory 12 which comprises the long field. The end of a long section is defined by the operation code or leading code which is recorded in the CO of the following zone.

Figure 2:
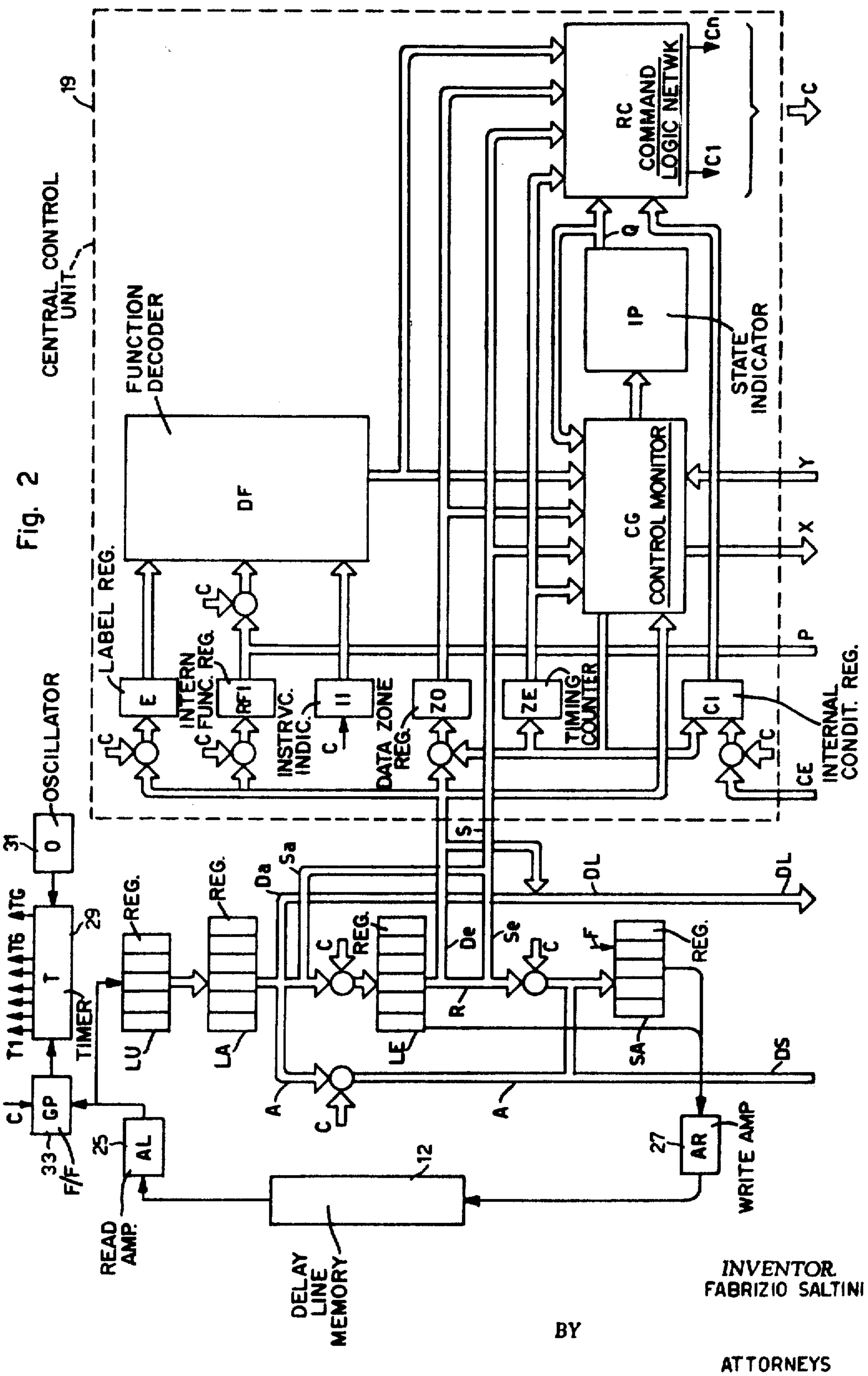
FIG. 2 is a more detailed block diagram of the central controller of the computer of FIG. 1.

Referring now to FIG. 2 of the drawings there is shown a more detailed block diagram of the central control unit 19 of the computer. The delay line memory 12 is provided with a reading transducer feeding a reading amplifier 25 and with a writing transducer fed by a writing amplifier 27, between which amplifiers there is interposed a group of four registers LU, LA, LE, SA for the circulation of the data contained in the memory 12.

A timing circuit 29, strobed by an oscillator 31 which is synchronized on the reading of the first bit of the contents of the memory 12, cyclically generates six successive pulses T1–T6 which identify six successive bit periods during which the six bits of a character are respectively made available at the output of the amplifier 25, and also generates a pulse TG every sixth pulse concurrently with pulse T6.

Under the control of the timing device 29, the first five bits B1–B5 of each character which leave the amplifier 25 during the pulses T1–T5 respectively are stored in the five bistable devices of the register LU. They are then transferred, simultaneously with the output of the sixth bit B6 during the pulse T6, to the register LA, so that the register LA receives in parallel all the six bits B1–B6.

On the next pulse TG, the contents of the register LA are transferred to the register LE. The same pulse TG transfers the bits B1 which was stored in the first bistable device of register LE to the writing amplifier 27 and the other bits B2–B6 contained in the remaining bistable devices of register LE to the five bistable devices of the register SA. From the register SA, the bits B2–B6 are delivered in order to the amplifier 27 at the times defined by the pulses T1–T5 respectively.

In this way, at each pulse TG, a certain character leaving the delay line 12 is introduced into the register LA and remains available therein until the following pulse TG, which transfers it to the register LE, where it remains available until the following pulse TG. Therefore, while a character is available in the register LA, the character which immediately precedes it in the delay line is available in the register LE. This makes it possible to operate on two adjacent characters in the memory 12 simultaneously.

The contents of a generic cell of the memory 12 may be erased by preventing the transfer thereof along the channel R from the register LE to the register SA. They may be modified by preventing the transfer thereof from the register LE to the register SA along the channel R and, at the same time, permitting the input into SA of information coming from the internal registers of the computer through the channel DS. They may be shifted in advance by one place by transferring the contents of the register LA to the register SA through the channel A instead of the register LE, and, finally, they may be shifted with a delay be a prefixed number of cells by blocking the input and output of the register LE and transferring the contents of the register LE to the register SA only after the prefixed number of digit periods has elapsed. It is also possible to delay only the B2 bit in the register LE while allowing the other to be transferred normally.

Each register LA, LE moreover respectively feeds the pair of channels *Sa*, *Da* and *Se*, *De*. The tag bits B1, B2 and the information bits B3–B6, of the characters present in the registers LA and LE are transferred via channels *Sa*, *Se* and *Da*, *De*, respectively, from the registers LA, LE to the other internal units of the computer.

The central control unit 19 controls the performance of the internal operations, that is those operations which do not involve peripheral units, with the exception of the tape memory. Moreover, this control supervises all of the remaining controls.

The central control unit 19 is composed of (FIG. 2):

- a register E ("label register") to which there is transferred the first character of the macroinstruction being executed at the moment. This first character has the function of a label in the sense that it indicates in what way the following characters of the macroinstruction are to be interpreted. The label character remains in the register E for the whole of the time necessary for interpreting and carrying out the corresponding macroinstruction;
- an instruction indicator II which indicates at any instant which cell of the program zone ZEO1 contains the first character of the instruction under execution at the moment;
- an internal functions register RFI to which the function character of an internal instruction to be carried out is transferred. This function character remains stored in the register RFI throughout the time required for interpreting and executing the instruction;
- a function decoder DF constituted by a logic network which decodes the contents of the label register E, the instruction indicator II and the function register RFI and which supplies an indication of the function corresponding to the current internal instruction;
- a counter ZE for the fixed zones ZEO1–ZEO6 of the memory 12, which indicates, at each reading cycle of the memory, the presence in the register LE of the characters contained in the cells of each of the said zones. The counter ZE supplies a continuous signal to the remaining units of the computer at a separate output for each of the first six memory zones, this continuous signal lasting, within the limits of each memory cycle, for the whole of the time required for reading the corresponding zone;
- a register ZO which indicates the presence of an operation code recorded in the leading cell of a zone while a character of that zone is present in the register LE. The register ZO has a group of outputs each of which corresponds to an operation code and remains energized during each memory cycle for the whole of the time required for reading the memory zone headed by the corresponding zone;
- a group of internal-condition storing bistable devices CI which, for example, indicate the results of the examination of memory zones and the presence of a number of jump conditions;
- a control monitoring unit CG constituted by a logic network which receives the outputs of the function decoder DF, the timing register ZO, the timing counter ZE, the channel S which is the sum of the channels *Sa* and *Se* and, through the channel Y, the outputs of the condition indicators of the peripheral controls (not shown).

On the basis of this information, the logic network CG monitors the timing counter ZE and the timing register ZO and the internal condition bistable devices CI. Moreover, the logic network CG transfers the indications given by the counter ZE and the register ZO to the peripheral controls on the channel X and commands a succession of states which characterize the operation of the computer.

To this end, the logic network CG controls a unit IP indicating states P and which comprises as many bistable devices P1 . . . P*n* as there are possible states P1 . . . p*n* in which the computer may be.

Each bistable remains set for the duration of the corresponding state. The unit IP supplies an indication of the present state to the logic network CG through the channel Q. The state indicator IP is switched from one state to the following one by a signal from the logic network CG which act on the basis of the indication which it receives the various units of the computer.

A command generating logic network RC, which receives inputs from the instruction decoder DF, the store timing register ZO, the memory timing counter ZE, the internal condition staticizer CI, the state indicator IP and also receives indications relating to the position of the tag bits B1 and B2 in the memory 12, generates commands C1–C*n* which control the succession of operations in the various units.

- Driving commands for the bistable devices which store the internal conditions, in which case the commands act by setting the bistable devices contained in the CI.
- Commands for writing characters and tag bits in the memory 12, in which case the commands act directly on the register SA through the channel F.

The central control unit 19 controls among other operations, data-zone heading operations, by generating commands for writing an operation code in the leading cell of the addressed zone through the medium of the register SA.

Addressing of the Memory 12

The contents of the memory 12, which are formed by bits of information in series, have a nonrecorded interval or "gap," between the last bit and the first bit of the items of information.

During each memory cycle an end-of-memory character FM is used to indicate the beginning of the "gap." A bistable device 33 is reset by a command C generated by the logic network RC upon the reading of the character and is set by the reading of the first bit leaving the amplifier 25 after the bistable device 33 has been reset. The setting of bistable device 33 synchronizes the pulses T1–T6 with the successive bits of information read, the pulses T1–T6 being supplied by the timing device 29 which receives the outputs of the oscillator 31.

At each cycle of the memory 12, the fixed-zone counter ZE, formed by six bistable devices connected in shift-register fashion, counts, under the control of the logic network CG, the six pulses TG corresponding to the reading of the beginning-of-zones bits B1 of the first six zones of the memory 12 and supplies six separate indications ZEO1–ZEO6 corresponding to these zones.

During each memory cycle, the data-zone indicating register ZO stores the bits B3–B5 of the leading cell of a data zone and, therefore, indicates the presence in the register LE of a zone headed by the stored operation code. ZO is controlled by the logic network CG which in turn receives the outputs of the register ZO and interprets the bits of information B3–B5 read in the register LE in correspondence with the beginning-of-zone bits B1.

The register ZO is formed by three bistable devices Z001, Z002, Z003 (not shown separately) and indicates by the setting of the bistable device Z001 a zone with an internal operations code, by the setting of the bistable device Z002 a zone with a printing operation code, by the simultaneous setting of the bistable devices Z001, Z002 a zone with a keyboard operation code and by the setting of the bistable device Z003 a zone with an external operations code.

The writing of the beginning-of-zone codes in the memory 12 is effected by internal instructions provided with an address and respectively located in places 7–8–9, 10–11–12, 13–14–1 5 of the normal macroinstruction.

The interpretation and execution of each instruction of the normal macroinstruction begin in the initial state P00 defined by the state indicator IP.

In the state P00, the instruction indicator II is enabled to count the 32 places of the macroinstruction in correspondence with the passage through the register LE of each of the 32 cells of the state ZEO1.

The instructions of the macroinstruction are read and interpreted under control of the central control unit 19 which, during the execution of each instruction, positions the tag bit B2 in the cell of the zone ZEO1 which contains the function character of the following instruction.

With the reading of the tag bit B2 in the zone ZEO1, the instruction indicator II and the label register E generate by means of the logic network DF a first signal which tells whether the execution of such instruction is to be controlled by the central control unit 19 or by another control.

With the end of the execution of an instruction which engages the central control unit 19 in the execution phase, the instruction indicator II is reset to zero, so as then to resume, with the first reading of the zone ZEO1, the count of the successive 32 cells of this zone and stop at the cell of the following instruction of that macroinstruction.

The operation code of a data zone of the memory 12 may be used to address that zone during successive cycles of the store, replacing a beginning-of-zone bit B1 counter. Moreover the code designates the respective zone for a predetermined internal-transfer or external-transfer operation. In this way the central control unit 19 is able to continue the execution of the following instructions of its program after it has instructed the transmission terminal unit 21 to transfer information between the long field and the external system 23. The transmission terminal addresses the long field by recognizing the operation code while the following instructions use the beginning-of-zone bit B1 counter.

A more complete description of the operation of the central control unit 19 and of the rest of the computer 11 may be found in the above-mentioned patent.

Transmission Terminal Unit

The transmission terminal unit 21 of the invention provides a general purpose interface for transferring information character by character between the computer 11 and an external system 23 which may be, for example, a peripheral unit, a transmission line or another computer. Its use greatly simplifies the interface requirements for the external system and allows the use of standard peripherals, etc., without having to modify them to fit the computer 11.

The alphabetical characters in the computer may be coded in a 7 bit ISO code. The numerical characters transmitted and received by the illustrated embodiment of the transmission terminal of the invention are also in the 7 bit ISO code with the last four bits being equal to the binary coded number and the first 3 bits being equal to the ISO code 101.

Figure 3:
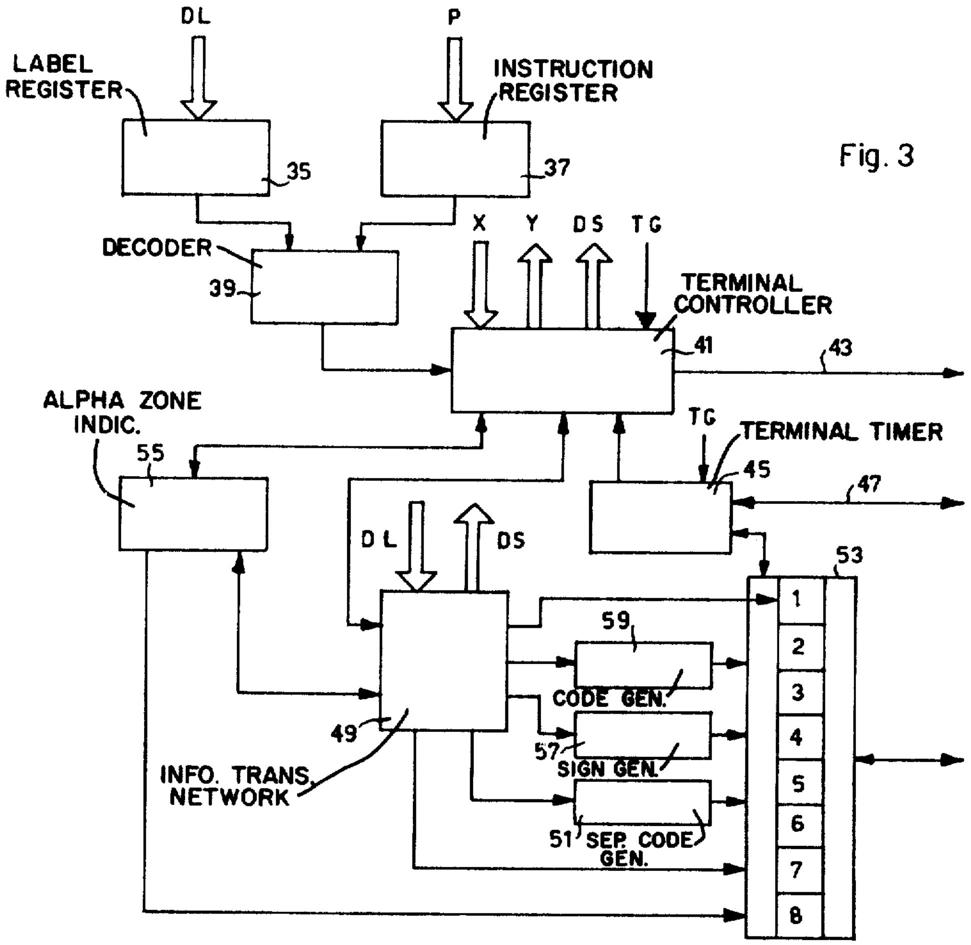
FIG. 3 is a more detailed block diagram of the illustrated embodiment of the transmission terminal unit of the invention.

A more detailed block diagram of the illustrated embodiment of the transmission terminal unit of the invention is shown in FIG. 3 of the drawings. In the case of transmission of information by the computer 11 to an external system 23 (FIG. 1), the central controller 19 transmits the label character of the macroinstruction (which is equal to 7) and the transmission instruction to the label register 35 and the instruction register 37, respectively. The contents of these registers are decoded in the decoder 39 whose output goes to the terminal controller 41. Upon receipt of the decoded transmission instruction the controller 41 first performs the preliminary operations of signalling the control monitoring circuit CG (FIG. 2) over line Y to write a B2 bit in the leading cell of the long field and of requesting access to the external system over line 43 for transmission of the information.

When the external system is ready to receive the first character it sends a signal to the terminal timer 45 over line 47 which in turn signals the controller 41. The next time that the leading cell of the long field is present in the register LE (recognized by the presence of the external operations code), the control monitoring unit CG signals the controller 41 over line X. The monitoring unit CG also signals the presence of the B2 bit at this time since the B2 bit is initially recorded in the leading cell of the long field.

On the basis of the ready signal from the external system and the long field and B2 bit signals from the monitoring unit CG the controller 41 sends a signal to the information transmission circuit 49 enabling it to read the contents of the LE register; in this case the leading cell of the long field. The information transmission circuit 49 upon sensing the presence of the bit B1 bit in the cell causes the unit separator code generator 51 to load the 7 bit ISO unit separator code into the buffer 53 and transmits the proper parity bit to the first bit place of the buffer 53.

When the buffer 53 has received the unit separator code it signals the timer 45 which in turn signals the external system over line 47 that it may read the contents of the buffer 53.

At the same time that the controller 41 signals the transmission circuit 49 to read the contents of the register LE it also signals the monitoring circuit CG over line Y for causing it to prevent the transfer of the B2 bit to register SA on the next timing pulse TG, thereby shifting the B2 bit into the second cell of the long field.

After the external system has read the contents of the buffer it signals over line 47 that it is ready to receive another character and the timer 45 again passes this signal onto the controller 41.

If a zone of the long field is an alphabetical zone it is preceded by two leading cells each having a B1 bit recorded therein. When the first leading cell is stored in the register LE the second leading cell is stored in the register LA. The monitoring unit CG senses this when it occurs and signals the presence of the alphabetical zone to the controller 41 over line X. The controller then activates the alphabetic zone indicator 55 for the duration of the transmission of the alphabetical zone.

If the first zone of the long field is an alphabetical zone, the monitoring unit CG signals this fact at the same time that it signals the presence of the leading cell of the long field and the B2 bit in the register LE.

On the next cycle of the delay line 12 after the external system signals that it is ready to receive the next character the same sequence of operation takes place; the second unit separator code is loaded into the buffer 53 and read by the external system and the B2 bit is shifted from the second to the third cell of the long field.

When the external system signals that it is ready to receive the next character, the first alphabetical character, occupying two cells of the delay line 12, is sent. The controller 41 again signals the monitoring unit CG of the readiness of the external system to receive the next character and the unit CG responds by signalling the controller 41 when the cell of the long field containing the B2 bit is present in the register LE.

The controller 41 then enables the transmission circuit 49 to read the contents of the register LE and to transfer the four information bits to the fifth through eight bit places of the buffer 53. The controller 41 also signals the monitoring unit CG to cause the B2 bit to be retained in the register LE on the next timing signal TG, thereby shifting it from the third to the fourth cell of the long field. On the occurrence of this next TG timing pulse, because the alphabetic zone indicator is activated, the controller 41 enables the transmission circuit 49 to read the first 3 information bits of the next cell of the long field, now stored in the register LE, and to transfer them to the second through fourth bits places of the buffer 53. The controller 41 also again signals the monitoring unit to shift the B2 bit from the fourth to the fifth cell of the long field by delaying it in the register LE and causes the timer 45 to signal the external system that the buffer 53 is full.

During the transmission of information to the external system the transmission circuit 49 may also compute a parity bit for each character transmitted and insert it into the first bit place of the buffer 53.

This procedure is repeated for each 2 cell character of the alphabetical zone of the long field. After the terminal unit has transmitted the last character of the alphabetical zone the B2 bit is stored in the leading cell of the following zone of the long field.

If the second zone of the long field is an alphabetical zone, evidenced by the presence of a second leading cell in the register LA simultaneously with the presence of the first leading cell in the register LE, the indicator 55 remains activated and the terminal unit proceeds to transmit the two unit separator codes and the two-cell characters in the same manner as was described above.

If the second zone is a numerical zone it is headed by a single leading cell, the B6 bit of which is a sign bit. When the external system requests the next character the controller 41 signals the monitoring unit CG over line Y.

The presence of a B1 bit with the B2 bit cause the monitoring unit CG to signal the end of alphabetical zone to the controller 41. The controller 41 then resets the alphabetical zone indicator 55, enables the transmission circuit 49 to read the contents of the register LE and signals the monitoring unit to shift the B2 bit to the following cell. The transmission circuit 49, sensing the presence of the B1 bit in the register LE, causes the generator 51 to transmit a unit separator code to the buffer 53.

After the external system reads the unit separator code from the buffer 53 it signals the timer 45 over line 47 that it is ready to receive the next character of the long field.

The controller 41 then signals the monitoring unit CG to indicate when the cell of the long field with the B2 bit is present in the register LA rather then in the register LE. That is, when the leading cell of the numerical zone is present in the register LE. When it receives this signal from the monitoring unit CG, the controller 41 enables the transmission circuit 49 to sense the sign bit (B6) of the register LE, to activate the sign generator 57 for loading the proper seven bit sign code into the buffer 53 and to load the parity bit into the first bit place.

After receiving a signal from the timer 45 that the buffer 53 is full, the external system reads its contents and, when it is ready, requests the next character. The controller 41, in response to this request, signals the monitoring unit CG over line Y. The monitoring unit CG in turn signals the controller 41 over line X when the cell of the long field having the B2 bit recorded therein, in this case the first information cell of the arithmetic zone, is present in the register LE. The controller 41 enables the transmission circuit 49 to transmit the bits B3–B6 in the register LE to the fifth through eight bit places of the buffer 53, to activate the code generator 59 to load the proper ISO code bits into the second through fourth bit places of the buffer 53 and to load the proper parity bit into the first bit place. The controller 41 also signals the monitoring unit CG to shift the B2 bit to the following cell.

The terminal unit continues to transmit the characters of the alphabetical and numerical zones of the long field in the manner described above until it comes to the cell having the external operations code recorded therein which indicates the end of the long field. When the transmission terminal reads this cell in the register LE it sends an end-of-message signal to the external system and deactivates itself. The computer 11 then goes on to execute the next instruction of its program.

The reception by the computer 11 of information from the external system if performed in a manner similar to the above-described transmission with one of the operations being reversed.

In the execution of an instruction for reception of information by the computer 11 from the external system the central controller 19 transmits the label character of the macroinstruction, in this case equal to 6, and the reception instruction to the label register 35 and the instruction register 37, respectively, of the terminal unit. The contents of these registers are decoded in the decoder 39 and sent to the controller 41.

Upon receipt of the decoded reception instruction the controller 41 sends signals to the monitoring unit CG for performing the preliminary operations of erasing all information stored in the long field between the leading cells except for B1 bits and recording a B2 bit in the leading cell of the long field. After the B2 bit is recorded in the long field the controller 41 causes the timer 45 to signal the external system that it is ready to receive the first character. The external system then loads the first information character (which is always a unit separator code) into the buffer 53 and signals the timer 45 that the buffer is loaded.

The controller 41, on the next signal from the monitoring unit CG of the presence in the register LE of the B2 bit within the long field, enables the transmission circuit 49 to transfer the information in the buffer 53 to the register SA over line DS on the next timing pulse TG and signals the monitoring circuit to shift the B2 bit into the following cell.

Since the information in the buffer 53 is in this case the unit separator code nothing is transmitted to the register SA and the leading cell remains as it was, with the external operations code and B1 bit recorded therein.

On the TG pulse following the loading of the information into the register SA the controller 41 causes the timer 45 to signal to the external system that it is ready to receive the next character. The external system then, when it is ready, loads the next character into the buffer 53 and signals to the timer 45 when it has finished. The controller 41 again enables the transmission circuit 45 to transfer the information in the buffer 53 to the register SA on the next pulse TG and causes the B2 bit to be shifted to the following cell.

If the second character is also a unit separator code the transmission circuit 49 loads nothing into the register SA and the cell remains blank except for a B1 bit if one had previously been recorded in the cell.

The transmission of two unit separator codes in a row indicates that the zone is an alphabetical zone and causes the information transmission circuit 49 to activate the alphabetical zone indicator 55 which causes the following characters to be interpreted as two-cell alphabetical characters.

In this case the controller 41 again causes the timer 45 to signal the external system on the next TG pulse and the external system loads the next character into the buffer 53 and signals when it has done so. When the B2 bit is again in the register LE the controller enables the transmission circuit 49 to transfer the information in the fifth through eight places of the buffer 53 on the next TG pulse to the information bit places of the register SA and to transfer the information stored in the second through fourth places on the following TG pulse to the first three information bit places (B3–B5) of register SA. The terminal proceeds to transfer the successive character from the external system to successive two-cell groups in the long field until the external system loads the buffer 53 with a unit separator code, thereby indicating the end of the alphabetical zone.

The transmission circuit 49 recognizes the unit separator code and resets the alphabetical zone indicator 55. On the signal from the monitoring unit CG indicating the presence of the B0 bit in the register LE the controller 41 enables the transmission circuit 49 to transfer the information stored in the buffer to the register SA on the next pulse TG and causes the B2 bit to be shifted to the following cell. Since the buffer 53 contains the unit separator code, nothing is sent to the register SA and the cell remains empty.

On the next TG pulse the terminal requests the next character.

If this zone is a numerical zone there is only one unit separator code and the second character is a sign code. The transmission circuit 49 recognizes the sign code and signals the controller 41 that the zone is a numerical one. The controller 41 in turn signals the monitoring unit CG for causing it to signal the controller 41 on the next memory cycle when the B2 bit is present in the register LA rather than in the register LE. That is when the leading cell of the numerical zone is present in the register LE. Upon receipt of this signal the controller 41 enables the transmission circuit to transmit the sign bit to the sixth bit place (B6) of the register SA on the next pulse TG.

The terminal then requests the next character from the external system which loads it into the buffer 53 and signals when it has done so.

Upon the receipt of the signal from the monitoring unit CG that the B2 bit is present in the register LE, the controller 41 enables the transmission circuit 49 to transfer the fifth through eighth bits of the buffer 53 to the information bit places of the register SA and causes the B2 bit to be shifted to the next cell. Because the alphabetical zone indicator 55 is not set the controller 41 does not enable the transmission circuit 49 to transfer the other bits in the buffer to the next cell of the long field but merely requests the next character from the external system.

The transmission terminal of the invention continues in this manner until the entire massage is loaded into the long field and an end of massage signal is received from the external system.

In the execution of an instruction for reception of information by the computer the long field initially may or may not be divided into a plurality of zones by B1 bits.

There are two types of instruction for the reception of information which may be stored in the instruction register 37. In the first type, described above, the B1 bits may be inserted into the leading cells of the zones of the long field either before or after the information is received.

The second type of instruction provides for the case when the segments of alphabetical information don't fill the segments of the long field set aside for them. In executing this type of reception instruction, the B1 bits must have already been recorded in the long field.

The reception of the information is performed in the same manner as was described above except that in alphabetical zones when the buffer 53 is loaded with a unit separator code, the controller 41, instead of causing the monitoring circuit CG to shift the B2 bit to the following cell and requesting the next character, causes the monitoring circuit CG to hold the B2 bit in the register LE for an indeterminate number of cell periods until the cell following the cell containing the next B1 bit is present in the register LE. Thus the next character received by the termined unit is recorded in the first cell of the following zone and a portion of the preceding zone is left blank.

There are also two types of instructions for the transmission of information to the external system, the first of which has been described above. The second type of transmission instruction is also useful when alphabetical zones of the long field are not completely filled.

After the terminal has transmitted the last character of a nonfull alphabetical zone the monitoring unit CG recognized that the next two cells are empty and signal the terminal to this effect. The controller 41 then signals the monitoring unit CG to shift the B2 bit to the next cell containing a B1 bit.

When the external system 23 wishes to send information to the computer 11, it signals the terminal 21 to this effect over line 43 to the controller 41. The controller 41 then signals the monitoring unit CG that the external system 23 wished to send the computer 11 information, which signal causes the CG to set one of the internal condition bistable device CI.

It is up to the programmer to put instructions in its program for testing the condition of the particular internal condition bistable device CI. When the computer, pursuant to an instruction, determines that the bistable device is set, it causes a jump to a special information reception subroutine for activating the transmission terminal 21 to receive the information from the external system. After receiving the information, the computer resumes the execution of its program.

As stated above, the connection between the transmission terminal 21 and the external system is a particularly simplified one. An illustration of an interface and an external system which could be connected to the transmission terminal of this invention is that discussed in U.S. Pat. application Ser. No. 764,708 which was filed on Oct. 3, 1968, now Pat. No. 3,564,511 and whose disclosure is hereby incorporated by reference.

What is claimed is:

1. A transmission terminal unit responsive to transfer instructions from a computer for serially transferring a plurality of information segments one at a time between successive locations within a region of a serial memory of the computer and an external system, said unit comprising:

a. buffer means for temporarily storing an information segment presently being transferred, b. transferring means for serially transferring the information segments between said buffer means and the successive locations in the serial memory, c. controlling means responsive to the instructions from the computer for controlling the direction of transfer of the information segments by said transferring means, said controlling means also being responsive to signals from said computer and said external system for controlling the timing of the transfer by enabling, after the receipt of a ready signal from the external system, said transferring means to operate to transfer the next successive information segment when said controlling means receives an indication provided by said buffer means that the location within the region of the serial memory which is next to be operated upon is available for transfers.

2. The terminal unit of claim 1, wherein the region of the serial memory includes a plurality of zones each of said zones conditionable for storing one or more units of alphabetical or numerical information, each of said zones being preceded by a corresponding identifying code and including a plurality of cells, each of said units of alphabetical information being stored in a pair of memory cells in said zones and each of said units of numerical information being stored in a single memory cell in said zones, and wherein said terminal unit further comprises means for indicating in response to said identifying code whether a numerical or alphabetical zone is presently involved in an information transfer operation, said controlling means being responsive to said indicating means to enable successive information segment transfers between said buffer means and pairs of memory cells when the alphabetical zone is indicated and to enable the successive transfer of information segments between said buffer means and successive single memory cells when the numerical zone is indicated.

3. The terminal unit of claim 2 wherein said numerical information units are each four-bit characters and wherein said transferring means further include means for inserting a three-bit code into said buffer means with the transmission of said numerical character for converting said numerical character into a seven-bit character.

4. The terminal unit of claim 2 wherein said controlling means further include means for causing the computer to skip to a subsequent zone when during transmission of the information segments the computer indicates that the next two cells are empty, and when during reception of information segments the external system indicates that the following information segments should be stored in said subsequent zone.

5. Apparatus for transferring information between a computer for executing a program comprising a series of instructions and an external system, said computer having a serial memory, said transferring apparatus being interconnected between said computer and said external system, said transferring apparatus comprising:

a. buffer means for temporarily storing an information segment presently being transferred, b. means for serially transferring successive information segments between said buffer means and successive locations in the serial memory, and c. controlling means responsive to predetermined program instructions from said computer for initiating and controlling the direction of transfer of the information segments, said controlling means also being responsive to signals from said computer and said external system for controlling the timing of the transfer of the successive information segments in response to the reception of signals from said computer and from said buffer means indicating that a subsequent segment of information is ready for processing.

6. The apparatus of claim 5 wherein said external system is a central data processing system and said computer is a local terminal for said system.

7. The apparatus of claim 6, wherein said computer includes means for carrying out the execution of subsequent instructions of its program while said information segments are being transferred to or from said central data processing system.

8. The terminal unit of claim 1, wherein the region of the memory includes a plurality of zones, each of said zones comprising a plurality of cells, each zone being conditionable for storing one or more units of alphabetical or numerical information and being headed by an identifying code comprising a beginning of zone code, and wherein said controlling means further include means for causing the computer to skip to a subsequent zone when during transmission of the information segments the computer indicates that the next two cells are empty, and when during reception of the information segments the external system indicates that the following information should be stored in said subsequent zone.

* * * * *

UNITED STATES PATENT OFFICE
CERTIFICATE OF CORRECTION

Patent No. 3,641,508 Dated February 8, 1972

Inventor(s) Fabrizio Saltini

It is certified that error appears in the above-identified patent and that said Letters Patent are hereby corrected as shown below:

Column 6, line 60, after "units." insert the following paragraph -- The commands may be, for example: --. Column 5, line 42, "be" should read -- by --.

Signed and sealed this 31st day of October 1972.

(SEAL)
Attest:

EDWARD M.FLETCHER,JR.
Attesting Officer

ROBERT GOTTSCHALK
Commissioner of Patents